United States Patent
Montreuil et al.

(10) Patent No.: US 7,390,469 B2
(45) Date of Patent: Jun. 24, 2008

(54) BIMODAL CATALYST-UREA SCR SYSTEM FOR ENHANCED $NO_X$ CONVERSION AND DURABILITY

(75) Inventors: Clifford Norman Montreuil, Livonia, MI (US); Joseph Robert Theis, Rockwood, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 679 days.

(21) Appl. No.: 10/904,444

(22) Filed: Nov. 10, 2004

(65) Prior Publication Data

US 2005/0112045 A1    May 26, 2005

Related U.S. Application Data

(62) Division of application No. 10/065,797, filed on Nov. 20, 2002, now Pat. No. 6,846,464.

(51) Int. Cl.
*B01D 53/56* (2006.01)
*B01D 53/92* (2006.01)
*B01D 53/94* (2006.01)

(52) U.S. Cl. .............. 423/213.2; 423/213.5; 423/213.7; 423/239.1; 423/245.3; 60/274; 60/282; 60/299; 60/301; 60/324

(58) Field of Classification Search .............. 423/239.1, 423/245.3, 213.2, 213.5, 213.7; 60/274, 60/282, 299, 301, 324
See application file for complete search history.

(56) References Cited

U.S. PATENT DOCUMENTS

| | | | |
|---|---|---|---|
| 3,755,534 | A | 8/1973 | Graham |
| 5,891,409 | A | 4/1999 | Hsiao et al. |
| 6,182,443 | B1 | 2/2001 | Jarvis et al. |
| 6,293,097 | B1 | 9/2001 | Wu et al. |
| 6,390,147 | B1 | 5/2002 | Channing |
| 6,427,439 | B1 | 8/2002 | Xu et al. |

(Continued)

FOREIGN PATENT DOCUMENTS

DE        40 32 085 A1 *    4/1992

(Continued)

OTHER PUBLICATIONS

European Search Report dated Mar. 3, 2005.*

(Continued)

*Primary Examiner*—Timothy C Vanoy
(74) *Attorney, Agent, or Firm*—Damian Porcari; Brooks Kushman P.C.

(57) ABSTRACT

The present invention discloses a method for reducing $NO_x$ in exhaust gases of an internal combustion engine. The purpose of this invention is to convert engine out $NO_x$ (approximately 90% NO in diesel exhaust) into roughly a 50:50 mixture of NO and $NO_2$, while simultaneously oxidizing engine-out hydrocarbons which interfere with the reduction of $NO_x$ by urea or ammonia. The present invention demonstrates that a 50:50 blend of NO and $NO_2$ is reduced more rapidly and with higher efficiency than a gas stream which is predominantly NO. In addition, catalyst in an engine exhaust that is a 50:50 mixture of NO and $NO_2$ is far more resistant to hydrothermal deterioration than using NO alone. In another embodiment of the present invention, a vehicle exhaust system utilizing the method of the present invention is provided.

28 Claims, 4 Drawing Sheets

U.S. PATENT DOCUMENTS

| | | |
|---|---|---|
| 6,449,945 B1 | 9/2002 | van Nieuwstadt |
| 6,470,673 B1 | 10/2002 | van Nieuwstadt et al. |
| 6,487,852 B1 | 12/2002 | Murphy et al. |
| 6,526,746 B1 | 3/2003 | Wu |
| 6,527,021 B2 | 3/2003 | Channing |
| 6,532,736 B2 | 3/2003 | Hammerle et al. |
| 6,546,720 B2 | 4/2003 | van Nieuwstadt |
| 6,554,031 B2 | 4/2003 | Channing |
| 2002/0054844 A1 | 5/2002 | Pfeifer et al. |
| 2002/0170616 A1 | 11/2002 | Channing |
| 2006/0010859 A1* | 1/2006 | Yan et al. .................. 60/286 |

FOREIGN PATENT DOCUMENTS

| | | |
|---|---|---|
| EP | 0 283 913 B1 * | 9/1988 |
| EP | 0 341 832 A2 * | 11/1989 |
| EP | 0 758 713 B1 * | 5/2001 |
| JP | 8-338320 A * | 12/1996 |
| WO | WO 99/39809 A1 * | 8/1999 |

OTHER PUBLICATIONS

"Recent Advances in the Development of Urea-SCR for Automotive Applications", by Manfred Koebel et al., SAE Technical Paper No. 2001-01-3625, Sep. 24-27, 2001, 12 pp.

"Application of Urea SCR to Light-Duty Diesel Vehicles", by Christine Lambert et al., SAE Technical Paper No. 2001-01-3623, © 2001, 6 pp.

"Using Diesel Aftertreatment Models to Guide System Design for Tier II Emission Standards", by Christine K. Lambert et al, SAE Technical Paper No. 2002-01-1868, © 2002, 6 pp.

* cited by examiner

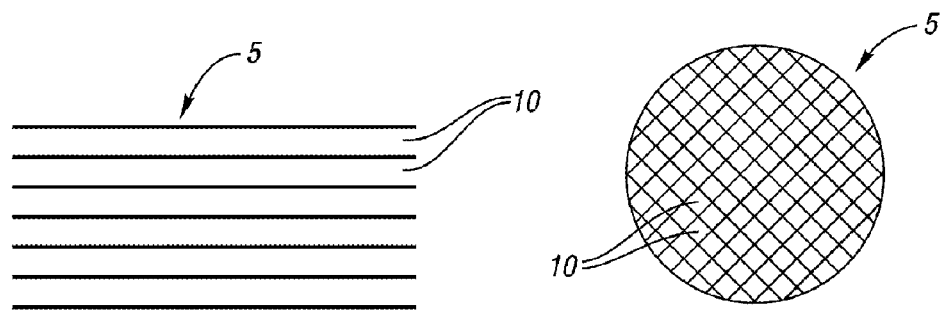
*Fig. 5a*  *Fig. 5b*
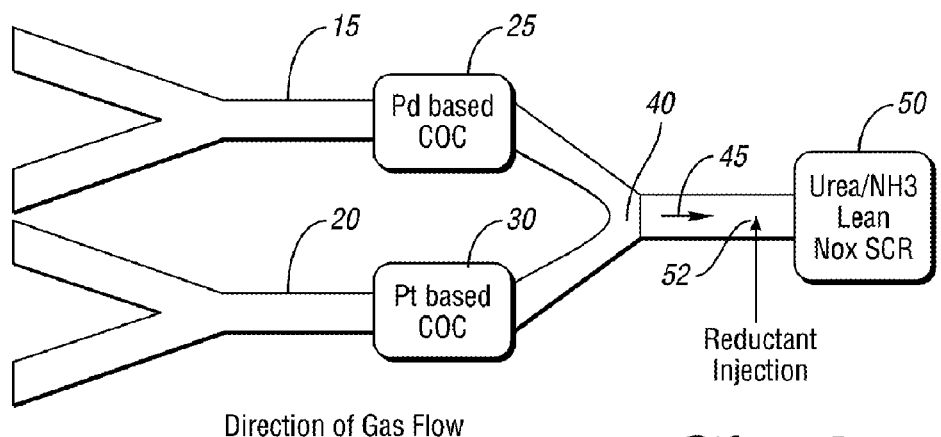
*Fig. 6*
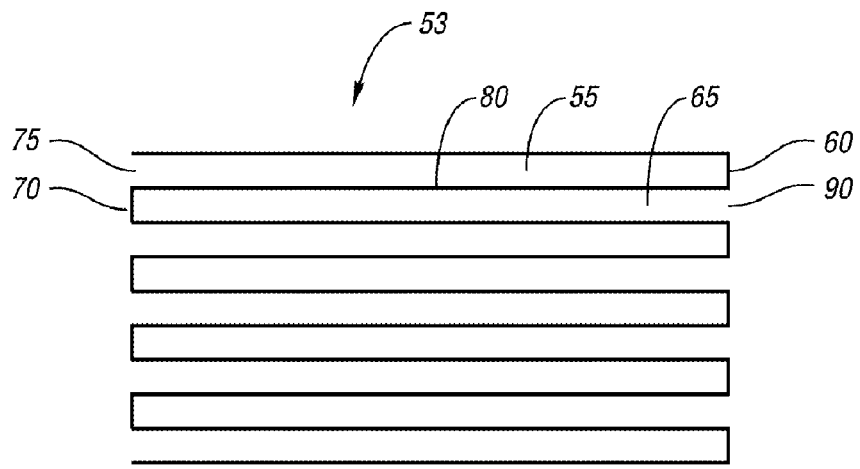
*Fig. 7*

BIMODAL CATALYST-UREA SCR SYSTEM FOR ENHANCED NO$_x$ CONVERSION AND DURABILITY

CROSS-REFERENCE TO RELATED APPLICATION

This application is a division of U.S. application Ser. No. 10/065,797 filed Nov. 20, 2002, and issued on Jan. 25, 2005 as U.S. Pat. No. 6,846,464.

BACKGROUND OF THE INVENTION

1. Field of the Invention

The present invention relates to methods of and systems for reducing NO$_x$ emissions from the exhaust of an internal combustion engine and, in particular, to methods of reducing NO$_x$ emission by adjusting the NO to NO$_2$ ratio in the exhaust before the exhaust gases flow through an SCR catalyst.

2. Background Art

Emissions of NO$_x$ and particulate matter (PM) are of primary concern for both diesel and gasoline vehicles to meet future emissions standards. Diesel vehicles have significant advantages over their gasoline counterparts including a more efficient engine, higher fuel economy, and lower emissions of HC, CO, and CO$_2$. For example, diesel vehicles potentially have a 40% higher fuel economy than current gasoline vehicles with 20% lower CO$_2$ emissions.

Control of NO$_x$ onboard a diesel vehicle is not a trivial task due to the high oxygen content of the exhaust gas. Such high oxygen fuel systems are typically referred to as lean burn systems. In such lean burn systems, NO$_x$ control is more difficult because of the high O$_2$ concentration in the exhaust, making conventional three-way catalysts ineffective. The available technologies for NO$_x$ reduction in lean environments include Selective Catalytic Reduction (SCR), in which NO$_x$ is continuously removed through active injection of a reductant over a catalyst and Lean NO$_x$ Traps (LNT), which are materials that adsorb NO$_x$ under lean conditions and must be periodically regenerated by running under rich conditions. Technologies utilizing an ammonia-based reductant, such as aqueous urea, have shown potential in achieving high NO$_x$ conversion with minimal fuel economy penalty. Selective Catalytic Reduction (SCR) with ammonia as the reductant has been used extensively for stationary source NO$_x$ control. The high selectivity of ammonia for reaction with NO$_x$ in high O$_2$ environments makes SCR attractive for use on diesel vehicles. Compared to ammonia, aqueous urea is much easier for use onboard a vehicle. Although such SCR catalysts show great potential for NO$_x$ control, utilization of such catalysts are adversely affected by the presence of hydrocarbons in a vehicle exhaust. Specifically, hydrocarbons are known to poison most SCR catalysts.

Various attempts have been made to understand and improve the performance of SCR catalysts. For example Koebel et al. discuss the reactions involved in the reaction between ammonia and NO$_x$. (Koebel et al., SAE Technical Paper Series, 2001-01-3625, 2001). Koebel shows that the main reaction between ammonia and NO is:

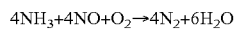

For this reaction, 1 mole of NO will consume 1 mole of ammonia and ¼ mole of oxygen. Koebel goes on to explain that a faster reaction is described by:

Accordingly, it is known that the performance of a NO$_x$ conversion system can be improved by increasing the fraction of NO$_2$ in the exhaust up to an optimal amount so that the fraction of NO$_2$ does not exceed 50%. Koebel states that this can be accomplished by oxidizing the NO with a strong oxidation catalyst such as platinum. Although urea is the preferred reducing agent for SCR catalysts, ammonia is still likely to be the ultimate reductant since urea rapidly liberates ammonia in the SCR catalyst.

Although the increased NO$_2$ is desirable in a vehicle exhaust, the prior art fails to teach a method for systematically and reliably attaining an optimal NO to NO$_2$ ratio in the exhaust. Furthermore, the prior art fails to teach a method that can be adjusted to give optimal performance for a given type of automobile engine.

SUMMARY OF THE INVENTION

The present invention overcomes the problems encountered in the prior art by providing a method of reducing NO$_x$ in exhaust gases of an internal combustion engine. The method of the present invention comprising the selective oxidation of the exhaust gases of an engine in which the NO and hydrocarbons in a first portion of the exhaust gases are oxidized separately from the remaining second portion of the exhaust gases. In this second gas portion, only the hydrocarbons are oxidized while the NO is left essentially unreacted. The resulting combined exhaust of the first and second exhaust gas portions optimally have a NO to NO$_2$ ration of about 1. As set forth above, this ratio is found to be more efficiently reduced by an SCR catalyst. The present invention provides a systematic approach for adjusting the NO to NO$_2$ ratio over a wide range of values by varying the amount of gases that comprise the first and second gas portions. Specifically, a first and second exhaust stream from an internal combustion engine are each separately passed through a different catalytic chamber. One exhaust stream is passed through a chamber that oxidizes both hydrocarbons and NO, while the other exhaust stream is passed through a second catalytic chamber that only efficiently oxidizes hydrocarbons while leaving NO essentially unreacted. The two exhaust gas steams are then recombined together and passed through an SCR catalyst. Accordingly, the present invention simultaneously oxides hydrocarbons in the exhaust which tend to poison the SCR catalyst and generates a NO to NO$_2$ ratio of about 1 in which NO$_x$ is more rapidly and efficiently reduced by the SCR catalyst.

In another embodiment of the present invention, a vehicle exhaust system deploying the method of the present invention is provided. The vehicle exhaust system of the present invention includes two different catalytic regions. One chamber efficiently oxidizes both hydrocarbons and NO, while the other region oxidizes hydrocarbons while leaving NO essentially unreacted. The exhaust system of the present invention further includes an SCR located downstream of the first and second catalytic regions.

BRIEF DESCRIPTION OF THE DRAWINGS

FIG. 5a is a longitudinal cross-section of monolith which has a plurality of essentially parallel tubes;

FIG. 5b is a transverse cross-section of monolith which has a plurality of essentially parallel tubes;

FIG. 6 is a schematic of the method of the present invention utilizing catalytic chambers which are monoliths;

FIG. 7 provides a longitudinal (cross-section parallel to the flow direction) cross-section through a particulate filter;

DETAILED DESCRIPTION OF THE PREFERRED EMBODIMENT(S)

Reference will now be made in detail to presently preferred compositions or embodiments and methods of the invention, which constitute the best modes of practicing the invention presently known to the inventors.

Figure 1:
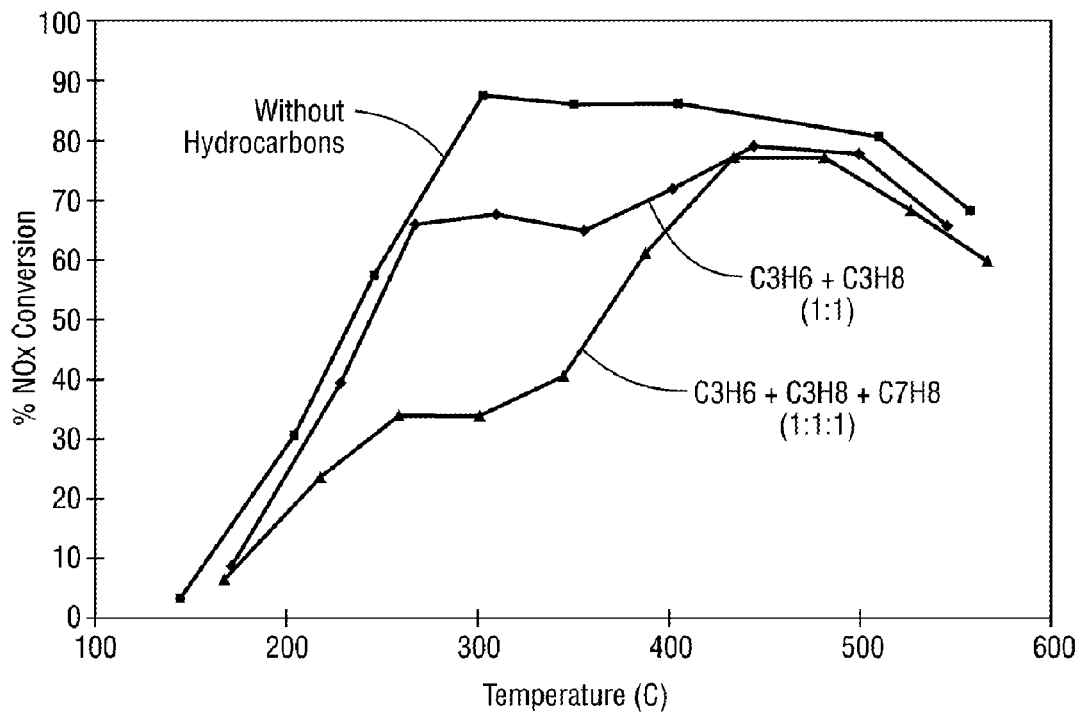
FIG. 1 is a plot of the NO$_x$ conversion efficiency for a gas sample containing varying amounts of hydrocarbons versus temperature.

The present invention provides a method of reducing $NO_x$ in exhaust gases of an internal combustion engine. Furthermore, the present invention provides a method in which hydrocarbons are efficiently removed from a vehicle exhaust prior to the exhaust gases flowing into an SCR catalyst. The deleterious effects of hydrocarbons on an SCR catalyst are illustrated with reference to FIG. 1. In FIG. 1, the percent conversion of $NO_x$ is plotted versus temperature for a gas stream containing zero, 450 ppm of 1-to-1 mixture of propane and propene, and 450 carbon ppm of a 1:1:1 mixture of propane, propylene and toluene. As used herein, "carbon ppm" refers to the amount of total carbon atoms. FIG. 1 clearly show that the presence of hydrocarbons decreases the efficiency of $NO_x$ conversion.

The method of the present invention may be utilized in either a diesel engine or a lean burn gasoline engine. The method comprises:

a) dividing the exhaust gases into a first exhaust gas portion and a second exhaust gas portion;

b) oxidizing hydrocarbons and NO in the first exhaust gas portion;

c) oxidizing hydrocarbons in the second exhaust gas portion while leaving the NO essentially unreacted;

d) recombining the first exhaust gas portion and the second exhaust gas portion to form a recombined exhaust gas; and e) exposing the recombined exhaust gas to an SCR catalyst wherein NO and $NO_2$ in the recombined exhaust gas is reduced.

Typically, such exposure is accomplished by flowing the exhaust gas through the SCR catalyst. Preferably, the ratio of the volume of the first exhaust gas portion to the volume of the second exhaust gas portion is from about 0.5 to about 2. More preferably, the ratio of the first exhaust gas portion to the volume of the second gas portion is from about 0.75 to 1.25, and most preferably about 1. The present invention provides a systematic approach for adjusting the NO to $NO_2$ ratio over a wide range of values by varying the amount of gases that comprise the first and second gas portions. In a typical exhaust from a diesel engine, the ratio of NO to $NO_2$ is approximately 10 (that is, there is a 10-fold excess of NO). When the ratio of the volume of the first exhaust to the second exhaust is about 1, the exhaust has been separated into two streams of approximately equal volume. Accordingly, this volume ratio results in a recombined exhaust gas that is 50/50 mixture of $NO/NO_2$. This ratio of NO to $NO_2$ is more rapidly and efficiently reduced by a urea or ammonia utilizing SCR (Selective Catalytic Reduction) catalyst than either a predominantly NO or $NO_2$ containing gas stream.

Figure 2:
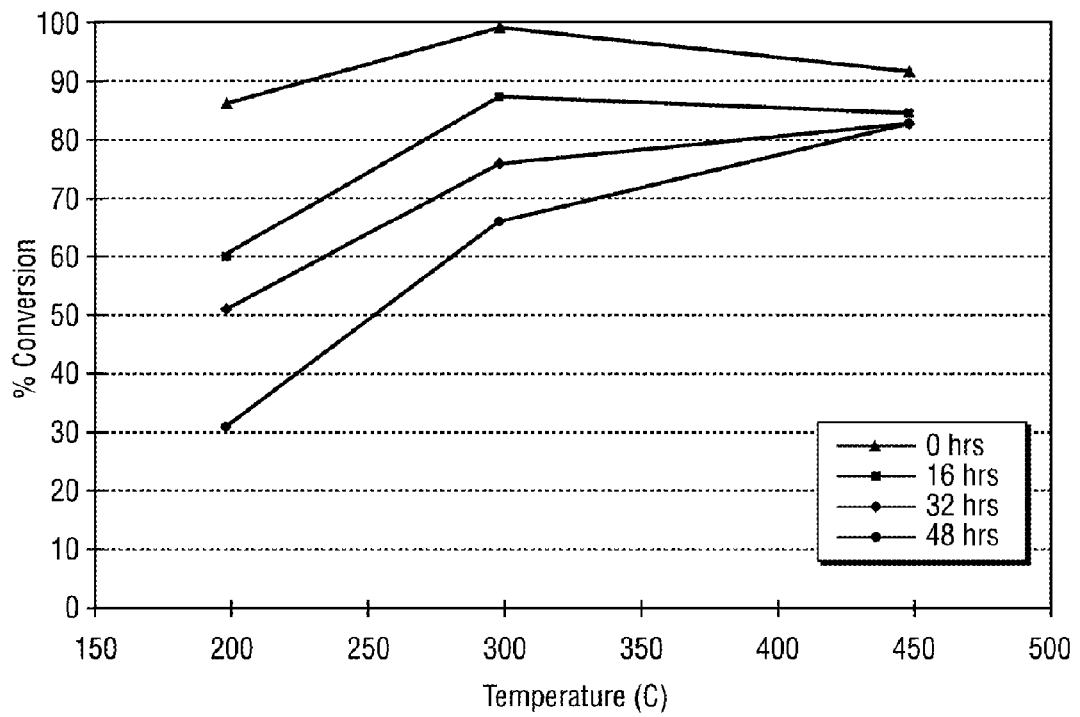
FIG. 2 is a plot of the conversion efficiency for a pure NO stream flowing through the SCR catalyst as a function of temperature after various periods of hydrothermal aging at 670° C.
Figure 3:
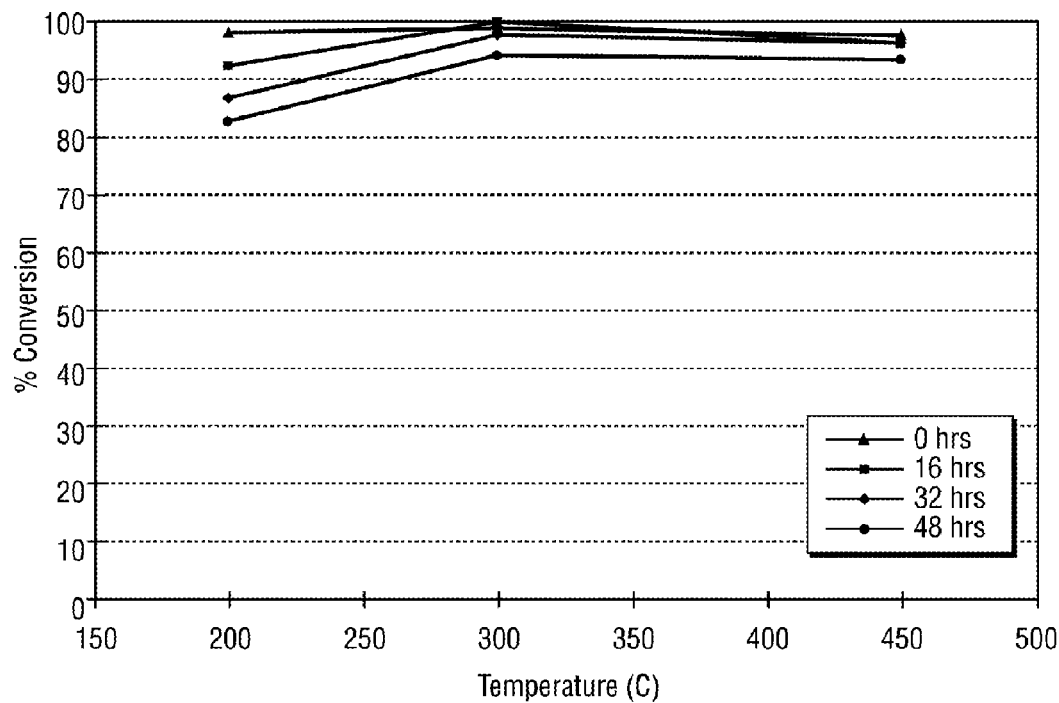
FIG. 3 is a plot of the conversion efficiency for a gas stream having NO and $NO_2$ in a ratio of about 1:1 flowing through the SCR catalyst as a function of temperature after various periods of HT aging at 670° C.

With reference to FIGS. 2 and 3, a plot of $NO_x$ conversion efficiency for an SCR catalyst is provided. The catalysts were aged for 16-hour increments up to 48 hours in a 670° C. gas stream. In FIG. 2, the conversion efficiency for a pure NO stream flow through the SCR catalyst as a function of temperature is given at varying times. There is significant loss of activity over the 48-hour aging cycle. FIG. 3 shows activity with time reducing a 50:50 stream of $NO:NO_2$. There is a higher initial conversion and far less deterioration than using NO alone. At temperatures between 200° and 400° C., the SCR catalyst is observed to experience a significant loss of efficiency over time. However, as illustrated in FIG. 2, a NO and $NO_2$ mixture shows an insignificant decrease in efficiency for the same temperature over the same time period. Accordingly, the method of the present invention provides superior $NO_x$ conversion efficiency over the temperature ranges characteristic for a vehicle exhaust system.

Figure 4:
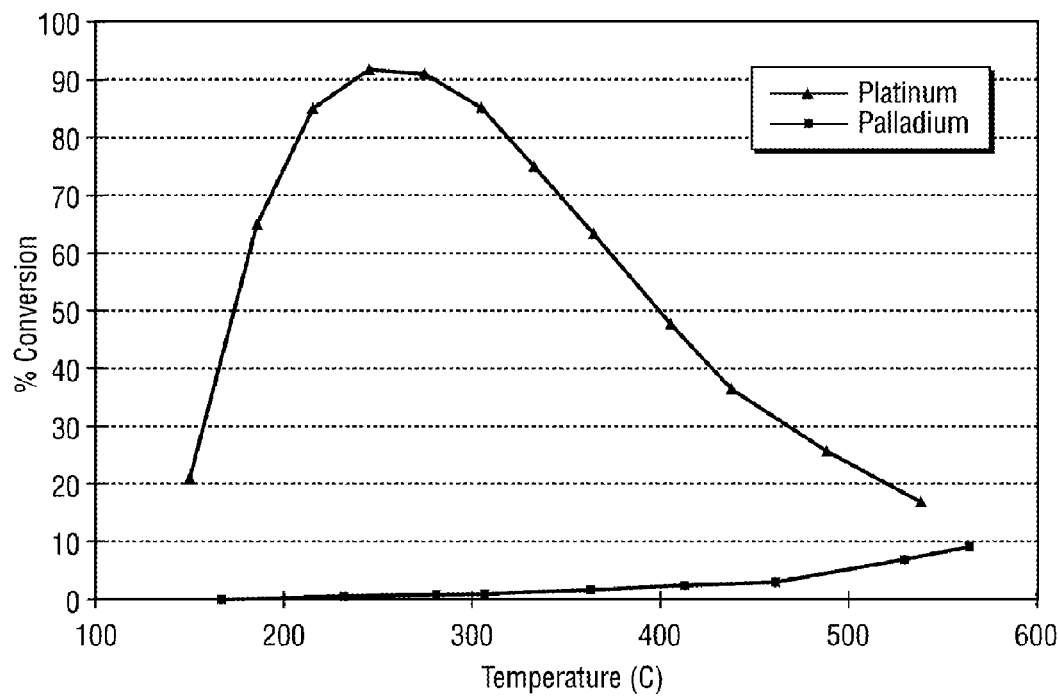
FIG. 4 is a plot of the conversion efficiency for the oxidation of NO to $NO_2$ for a gas stream having 350 ppm NO, 14% $O_2$, 5% CO, 4.5% $H_2O$, and balance $N_2$ flowing over a platinum and a palladium catalyst.

In an embodiment of the present invention, the step of oxidizing the first exhaust gas portion comprises flowing the first exhaust gas portion through a first catalytic chamber that includes platinum and the step of oxidizing the second exhaust gas comprises flowing the second gas portion through a second catalytic chamber that includes palladium. Both platinum and palladium are known to oxidize hydrocarbons. However, platinum is found to efficiently oxidize NO to $NO_2$, while palladium does not. With reference to FIG. 4, a plot of the conversion efficiency for the oxidation of NO to $NO_2$ for a gas stream having 350 ppm NO, 14% $O_2$, 5% CO, 4.5% $H_2O$, and balance $N_2$ flowing over a platinum and a palladium catalyst is provided. FIG. 4 clearly demonstrates the effectiveness of platinum and the minimal ability of palladium to oxidize NO.

Preferably, this first catalytic chamber is a monolith, the monolith comprising a plurality of essentially parallel tubes through which the exhaust gases flow. Furthermore, the essentially parallel tubes are coated with platinum. The construction of the monolith is best understood by reference to FIGS. 5a and 5b. FIG. 5a provides a longitudinal cross-section of monolith 5 which has a plurality of essentially parallel tubes 10. FIG. 5b is a top view of the monolith illustrating that the plurality of tubes 10 form a honeycomb arrangement. Furthermore, this embodiment is best understood by reference to FIG. 6 which provides a schematic of the method of the present invention utilizing catalytic chambers which are monoliths. In FIG. 6, an exhaust gas stream has been divided into gas streams 15, 20. Gas stream 20 flows through first catalytic monolith 30 which is coated with platinum, and gas stream 15 flows through catalytic monolith 25 which is coated with palladium. Gas streams 15 and 20 are then recombined at joint 40 to form recombined gas stream

45. Recombined gas stream 45 then flows through SCR catalyst 50 where the NO and $NO_2$ are reduced. The reductant is injected into the exhaust gas stream at position 52.

Figure 8:
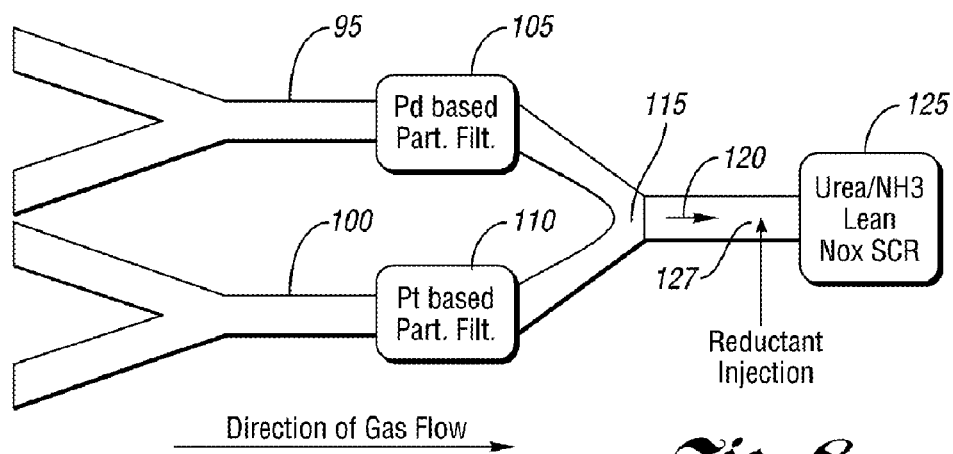
FIG. 8 is a schematic of the method of the present invention utilizing catalytic chambers which are particulate filters.

In a variation of this embodiment, the first and second catalytic chambers are each individually a particulate filter having channels through which the exhaust gases flow. In the case of the first catalytic chamber, the channels are coated with platinum. For the second catalytic chamber, the channels are coated with palladium. Particulate filters differ from the monoliths described above in that the channels of a particulate chamber are blocked off on one end, thereby causing gases that enter to diffuse to adjacent channels before emerging from the opposite ends of the filter. Accordingly, particulate matter is removed from the gas stream. The construction of the particulate filter is best understood by reference to FIG. 7. FIG. 7 provides a longitudinal (cross-section parallel to the flow direction) cross-section through particulate filter 53. Channel 55 is blocked off on end 60, and channel 65 is blocked off on end 70. Accordingly, gas that enters end 75 of channel 55 cannot emerge from end 65. Instead, the gas must flow through a wall, such as wall 80, and flow through an adjacent channel, such as channel 65, where it can emerge from end 90 which is not blocked off. The method of this variation is best understood with reference to FIG. 8. In FIG. 8, an exhaust gas stream has been divided into gas streams 95, 100. Gas stream 100 flows through first particulate filter 110 which is coated with platinum, and gas stream 95 flows through second particulate filter 105 which is coated with palladium. Gas streams 95 and 100 are then recombined at joint 115 to form recombined gas stream 120. Recombined gas stream 120 then flows through SCR catalyst 125 where the NO and $NO_2$ are reduced. The reductant is injected into the exhaust stream at position 127.

Figure 9A:
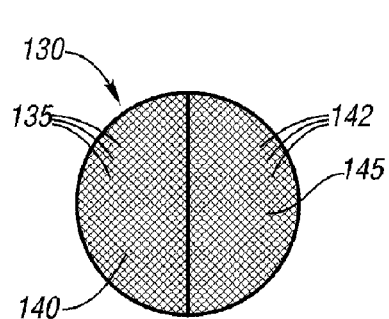
FIGS. 9a, 9b and 9c each depict a transverse cross-section through a monolith illustrating a first and second group of tubes coated with different catalytic materials according to various embodiments of the present invention.
Figure 9B:
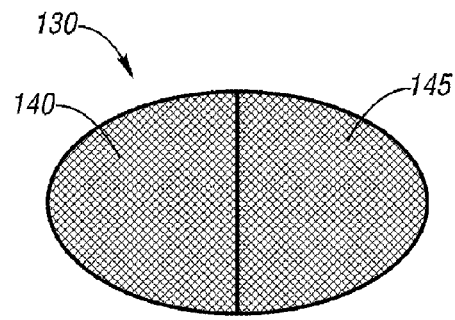
Figure 9C:
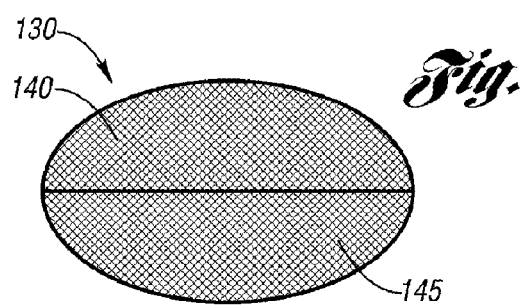

In yet another embodiment of the present invention, a method of reducing $NO_x$ in exhaust gases of an internal combustion engine is provided. The method of this embodiment corresponds to combining steps a, b, and c as set forth above. The combination of these steps is accomplished by flowing the exhaust gases through a single catalytic monolith where the catalytic monolith comprises a plurality of essentially parallel tubes through which the exhaust gases flow. However, in this embodiment, a first group of the tubes are coated with a first catalytic material that oxidizes the NO and the hydrocarbons, and a second group of the tubes are coated with a second catalytic material that oxidizes the hydrocarbons while leaving the NO essentially unreacted. Preferably, the first group of tubes is coated with a first coating that includes platinum, and the second group of tubes is coated with a second coating that includes palladium. The ratio of the number of tubes in the first group of tubes to the number of tubes in the second group of tubes is from about 0.5 to about 2. More preferably, the ratio of the number of tubes in the first group of tubes to the number of tubes in the second group of tubes is about 1. This embodiment is best understood by reference to FIG. 9, which provides a schematic of the method of the present invention a first group of the tubes are coated with a first catalytic material that oxidizes the NO and the hydrocarbons and a second group of the tubes are coated with a second catalytic material that oxidizes the hydrocarbons while leaving the NO essentially unreacted. FIGS. 9a, 9b, and 9c provide a transverse cross-section through monolith 130. The interior walls of the tubes 135 in monolith section 140 are coated with a first catalytic material that oxidizes the NO and the hydrocarbons, while the interior walls of the tubes 142 in monolith section 145 are coated with a second catalytic material that oxidizes the hydrocarbons while leaving the NO essentially unreacted. The only differences between FIGS. 9a, 9b and 9c are the different cross-sectional shapes between FIG. 9a and FIGS. 9b and 9c and the choice of which section of tubes to coat with the different catalysts in FIG. 9b and FIG. 9c.

Figure 10:
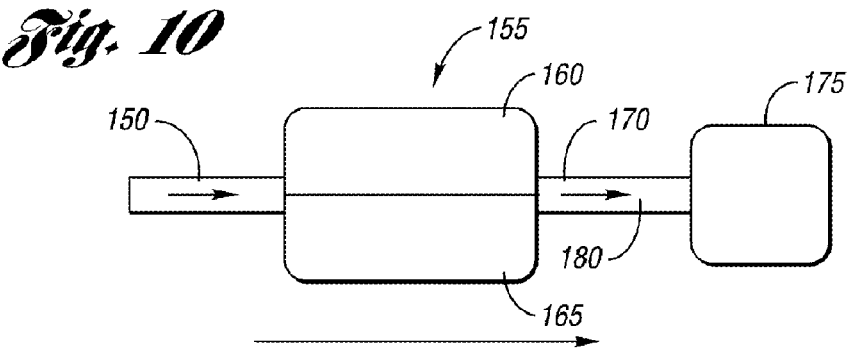
FIG. 10 is a schematic of the method of the present invention utilizing a monolith, with a first group of the tubes coated with a first catalytic material that oxidizes the NO and the hydrocarbons, and a second group of the tubes are with a second catalytic material that oxidizes the hydrocarbons while leaving the NO essentially unreacted.

With reference to FIG. 10, a schematic of the method utilizing a monolith with a first group of the tubes coated with a first catalytic material that oxidizes the NO and the hydrocarbons and a second group of the tubes are with a second catalytic material that oxidizes the hydrocarbons while leaving the NO essentially unreacted is provided. In FIG. 10, gas stream 150 flows through catalytic monolith 155 in which first group of the tubes 160 are coated with a first catalytic material that oxidizes the NO, and the hydrocarbons and second group of the tubes 165 are coated with a second catalytic material that oxidizes the hydrocarbons while leaving the NO essentially unreacted. Treated gas stream 170 then flows through SCR catalyst 175 where the NO and $NO_2$ are reduced. The reductant is injected into the exhaust stream at position 180. In a variation of this embodiment, catalytic monolith 155 is replaced by a particulate filter. In this variation, first groups of tubes 160 and second group of tubes 165 will be the channels of a particulate filter as described above for FIG. 7.

In yet another embodiment of the present invention, a vehicle exhaust system which reduces $NO_x$ in the exhaust gases of an internal combustion engine is provided. This vehicle exhaust system comprises:

a first catalytic chamber through which a first exhaust gas portion flows wherein the first catalytic chamber oxidizes NO and hydrocarbons; and a second catalytic chamber through which a second exhaust gas portion flows wherein the second catalytic chamber oxidizes hydrocarbons while leaving NO essentially unreacted.

The vehicle exhaust system of this embodiment further comprises an SCR catalyst located downstream of the first and second catalytic chambers. Preferably, the first and second catalytic chambers are each separately and individually a monolith having a plurality of essentially parallel tubes through which the exhaust gases flow. The parallel tubes for the first catalytic chamber are coated with platinum, while the parallel tubes for the second monolith are coated with palladium. This embodiment is best understood with reference to FIGS. 5a, 5b and 6 as described above. In a variation, the first and second catalytic chambers are each separately and individually a particulate filter having channels through which the exhaust gases flow. This variation is best understood by reference to FIGS. 7 and 8 as described above. Similarly, the channels for the first particulate filter are coated with platinum, while the channels for the second monolith are coated with palladium. The first exhaust gas portion and second gas portions may be formed by attaching a flow channel from separate sections of the exhaust manifold. Alternatively, a flow divider may be used to separate the first and second exhaust gas portions. Such a flow divider may be any device that separates the flow of the exhaust gas into two gas streams. Such devices include, but are not limited to, a Y or T joint.

In still another embodiment of the present invention, a variation of the above vehicle exhaust system is provided. This embodiment is best understood with reference to FIGS. 9 and 10 as described above. The vehicle exhaust system of this variation comprises a catalytic monolith that has a plurality of channels through which the exhaust gases flow, wherein a first group of channels are coated with a first catalytic material that oxidizes the NO and the hydrocarbons, and a second group of the channels are coated with a second catalytic material that oxidizes the hydrocarbons while leaving the NO essentially unreacted. This selective oxidation is accomplished by coating the first group of tubes with a first coating that includes platinum and the second group of tubes is coated with a second coating that includes palladium. In this preferred embodiment, the ratio of the number of tubes in the first group of tubes to the number of tubes in the second group of tubes is preferably from about 0.5 to about 2, more preferably 0.75 to 1.25, and most preferably about 1. In one variation of this embodiment, the first and second groups of channels are different groups of essentially parallel tubes of a monolith as described above by FIGS. 5 and 9. In another variation of this embodiment, the first and second channels are different groups of channels of a particulate filter as described above for FIG. 7.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of reducing NOx in exhaust gases of an internal combustion engine, the method comprising:
   a) dividing the exhaust gases into a first exhaust gas portion and a second exhaust gas portion;
   b) oxidizing hydrocarbons and NO in the first exhaust gas portion;
   c) oxidizing hydrocarbons in the second exhaust gas portion while leaving the NO essentially unreacted;
   d) recombining the first exhaust gas portion and the second exhaust gas portion to form a recombined exhaust gas; and
   e) exposing the recombined exhaust gas to an SCR catalyst wherein NO and NO2 in the recombined exhaust gas is reduced.

2. The method of claim 1 wherein the internal combustion engine is a diesel engine or a lean burn gasoline engine.

3. The method of claim 1 wherein the ratio of the volume of the first exhaust gas portion to the volume of the second exhaust gas portion is from about 0.5 to about 2.

4. The method of claim 1 wherein the ratio of the volume of the first exhaust gas portion to the volume of the second exhaust gas portion is about 1.

5. The method of claim 1 wherein the step of oxidizing the first exhaust gas portion comprises flowing the first exhaust gas portion through a first catalytic chamber that includes platinum.

6. The method of claim 5 wherein the first catalytic chamber is a monolith, the monolith comprising a plurality of essentially parallel tubes through which the exhaust gases flow.

7. The method of claim 6 wherein the essentially parallel tubes are coated with platinum.

8. The method of claim 5 wherein the first catalytic chamber is a particulate filter, the particulate filter comprising channels through which the exhaust gases flow.

9. The method of claim 8 wherein the channels are coated with platinum.

10. The method of claim 1 wherein the step of oxidizing the second exhaust gas portion comprises flowing the second exhaust gas portion through a second catalytic chamber that includes palladium.

11. The method of claim 10 wherein the second catalytic chamber is a monolith, the monolith comprising a plurality of essentially parallel tubes through which the exhaust gases flow.

12. The method of claim 11 wherein the essentially parallel tubes are coated with palladium.

13. The method of claim 10 wherein the second catalytic chamber is a particulate filter, the particulate filter comprising channels through which the exhaust gases flow.

14. The method of claim 13 wherein the channels are coated with palladium.

15. The method of claim 1 wherein steps a, b and c are combined together by flowing the exhaust gases through a catalytic monolith, the catalytic monolith comprising a plurality of essentially parallel tubes through which the exhaust gases flow, wherein a first group of the tubes are coated with a first catalytic material that oxidizes the NO and the hydrocarbons and a second group of the tubes are coated with a second catalytic material that oxidizes the hydrocarbons while leaving the NO essentially unreacted.

16. The method of claim 15 wherein the first group of tubes is coated with a first coating that includes platinum and the second group of tubes is coated with a second coating that includes palladium.

17. The method of claim 15 wherein the ratio of the number of tubes in the first group of tubes to the number of tubes in the second group of tubes is from about 0.5 to about 2.

18. The method of claim 15 wherein the ratio of the number of tubes in the first group of tubes to the number of tubes in the second group of tubes is about 1.

19. A method of reducing NOx in exhaust gases of an internal combustion engine, the method comprising:
   a) dividing the exhaust gases into a first exhaust gas portion and a second exhaust gas portion;
   b) oxidizing hydrocarbons and NO in the first exhaust gas portion by flowing the first exhaust gas portion through a first catalytic chamber, the first catalytic chamber being a monolith comprising a first plurality of essentially parallel tubes;
   c) oxidizing hydrocarbons in the second exhaust gas portion while leaving the NO essentially unreacted by flowing the second exhaust gas portion through a second catalytic chamber, the second catalytic chamber being a monolith comprising a second plurality of essentially parallel tubes;
   d) recombining the first exhaust gas portion and the second exhaust gas portion to form a recombined exhaust gas; and
   e) exposing the recombined exhaust gas to an SCR catalyst wherein NO and NO2 in the recombined exhaust gas is reduced.

20. The method of claim 19 wherein the first and second pluralities of essentially parallel tubes are coated with platinum.

21. The method of claim 19 wherein the internal combustion engine is a diesel engine or a lean burn gasoline engine.

22. The method of claim 19 wherein the ratio of the volume of the first exhaust gas portion to the volume of the second exhaust gas portion is from about 0.5 to about 2.

23. The method of claim 19 wherein the ratio of the volume of the first exhaust gas portion to the volume of the second exhaust gas portion is about 1.

24. A method of reducing NOx in exhaust gases of an internal combustion engine, the method comprising:
   a) dividing the exhaust gases into a first exhaust gas portion and a second exhaust gas portion;
   b) oxidizing hydrocarbons and NO in the first exhaust gas portion by flowing the first exhaust gas portion through a first catalytic chamber, the first catalytic chamber being a particulate filter comprising a first plurality of channels;

c) oxidizing hydrocarbons in the second exhaust gas portion while leaving the NO essentially unreacted by flowing the second exhaust gas portion through a second catalytic chamber, the second catalytic chamber being a particulate filter comprising a second plurality of channels;

d) recombining the first exhaust gas portion and the second exhaust gas portion to form a recombined exhaust gas; and e) exposing the recombined exhaust gas to an SCR catalyst wherein NO and NO2 in the recombined exhaust gas is reduced.

25. The method of claim 24 wherein the first and second pluralities of channels are coated with platinum.

26. The method of claim 24 wherein the internal combustion engine is a diesel engine or a lean burn gasoline engine.

27. The method of claim 24 wherein the ratio of the volume of the first exhaust gas portion to the volume of the second exhaust gas portion is from about 0.5 to about 2.

28. The method of claim 24 wherein the ratio of the volume of the first exhaust gas portion to the volume of the second exhaust gas portion is about 1.

* * * * *